United States Patent
Wu et al.

(10) Patent No.: US 9,963,533 B2
(45) Date of Patent: May 8, 2018

(54) COPOLYMER AND EPOXY RESIN COMPOSITE

(71) Applicant: INDUSTRIAL TECHNOLOGY RESEARCH INSTITUTE, Hsinchu (TW)

(72) Inventors: Chien-Pang Wu, Xiushui Shiang (TW); Li-Cheng Jheng, Tainan (TW); Chia-Hao Li, Tainan (TW); Jyh-Horng Wu, Kaohsiung (TW); Hsi-Hsin Shih, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 370 days.

(21) Appl. No.: 14/978,968

(22) Filed: Dec. 22, 2015

(65) Prior Publication Data

US 2017/0145134 A1    May 25, 2017

(30) Foreign Application Priority Data

Nov. 25, 2015    (TW) ............... 104139086 A

(51) Int. Cl.
*C08F 236/12* (2006.01)
*C08L 63/00* (2006.01)
*C08G 81/02* (2006.01)

(52) U.S. Cl.
CPC .......... *C08F 236/12* (2013.01); *C08G 81/025* (2013.01); *C08L 63/00* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 3,285,949 A | 11/1966 | Siebert | |
| 6,894,113 B2 | 5/2005 | Court et al. | |
| 7,838,587 B2 | 11/2010 | El Bounia et al. | |
| 7,915,344 B2 * | 3/2011 | Kramer | C08C 19/36 525/111 |
| 8,552,104 B2 | 10/2013 | Verghese et al. | |
| 8,749,076 B2 | 6/2014 | Okada et al. | |
| 8,915,678 B2 | 12/2014 | Boulkertous et al. | |
| 2008/0260955 A1 | 10/2008 | Hoyles et al. | |
| 2010/0172996 A1 | 7/2010 | Shin et al. | |
| 2010/0221559 A1 | 9/2010 | Konno et al. | |
| 2014/0144481 A1 | 5/2014 | Hayashi et al. | |

FOREIGN PATENT DOCUMENTS

| | | |
|---|---|---|
| CN | 1422316 A | 6/2003 |
| CN | 101595134 A | 12/2009 |
| TW | 200613429 | 5/2006 |
| TW | I338706 B | 3/2011 |
| TW | I374163 B | 10/2012 |
| TW | 201418354 A | 5/2014 |

OTHER PUBLICATIONS

Taiwanese Office Action and Search Report, dated Jun. 23, 2016, for Taiwanese Application No. 104139086.
Chikhi et al., "Modification of epoxy resin using reactive liquid (ATNB) rubber", European Polymer Journal 38, pp. 251-264, (2002).
Heng et al., "Simultaneously enhanced tensile strength and fracture toughness of epoxy resins by a poly(ethylene oxide)-block-carboxyl terminated butadiene-acrylonitrile rubber dilock copolymer", RSC Adv. 5, pp. 42362-42368, 2015.
Kishi et al., "Nano-phase structures and mechanical properties of epoxy/acryl triblock copolymer alloys", Polymer 52, pp. 760-768, (2011).
Ochi et al., "Toughening of Cured Epoxy Resins by Modifications with Aramid-CTBN Block Copolymers", Kobunshi Ronbunshu vol. 49, No. 12, pp. 953-960, (Dec. 1992).
Tripathy et al., "Polyisobutylene Modified Bisphenol A Diglycidyl Ether Based Epoxy Resins Possessing Improved Mechanical Properties", American Chemical Society, Macromolecules 44, pp. 6800-6809, 2011.

* cited by examiner

*Primary Examiner* — Megan McCulley
(74) *Attorney, Agent, or Firm* — Birch, Stewart, Kolasch & Birch, LLP

(57) ABSTRACT

A copolymer is provided, which includes a chemical structure of:

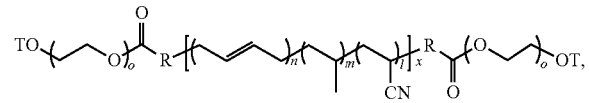

R is $C_{1-6}$ alkylene group. T is a terminal group including $C_{1-6}$ alkyl group, $C_{3-6}$ cycloalkyl group, or $C_{6-12}$ aromatic group. l is 0.05 to 0.3, m is 0.1 to 0.2, n is 0.5 to 0.8, l+m+n=1, x is 40 to 100, and o is 10 to 120. An epoxy resin composite is also provided, which includes 100 parts by weight of epoxy resin and 1 to 20 parts by weight of toughness enhancer such as the above copolymer.

7 Claims, No Drawings

COPOLYMER AND EPOXY RESIN COMPOSITE

CROSS REFERENCE TO RELATED APPLICATIONS

The present application is based on, and claims priority from, Taiwan Application Serial Number 104139086, filed on Nov. 25, 2015, the disclosure of which is hereby incorporated by reference herein in its entirety

TECHNICAL FIELD

The technical field relates to an epoxy resin composite, and in particular it relates to a chemical structure of a toughness enhancer in the epoxy resin composite.

BACKGROUND

Thermosetting epoxy resins have been widely applied in several fields such as building, coating material, electronic equipment, and cellulose composite material. However, the thermosetting epoxy resin will be a polymer network of high crosslink density, and it has problems such as brittleness and poor impact resistance. With recent developments of composite material, coating material, and electronic equipment, a thermosetting epoxy resin with a better thermal stability is especially demanded. The thermal stability of the thermosetting epoxy resin is generally enhanced by increasing its crosslink density, but it may make the epoxy resin be more brittle with a lower impact resistance. Therefore, enhancing the toughness of the epoxy resin is an important topic for development. The toughness of the epoxy resin can be enhanced by adding carboxyl terminated butadiene acrylonitrile (CTBN), but it may lower the thermal stability (glass transfer temperature) of the epoxy resin. Accordingly, a method of simultaneously improving the toughness and keeping the thermal stability of the epoxy resin is called-for.

SUMMARY

One embodiment of the disclosure provides a copolymer, having a chemical structure of:

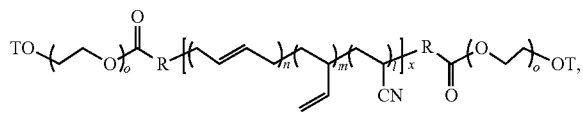

wherein R is $C_{1-6}$ alkylene group; T is a terminal group including $C_{1-6}$ alkyl group, $C_{3-6}$ cycloalkyl group, or $C_{6-12}$ aromatic group; l is 0.05 to 0.3; m is 0.1 to 0.2; n is 0.5 to 0.8; 1+m+n=1; x is 40 to 100; and o is 10 to 120.

One embodiment of the disclosure provides an epoxy resin composite, comprising: 100 parts by weight of epoxy resin; and 1 to 20 parts by weight of a toughness enhancer, wherein the toughness enhancer is a copolymer having a chemical structure:

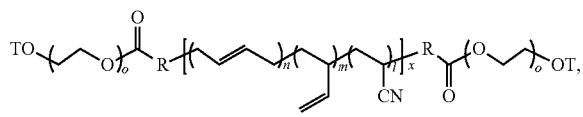

wherein R is $C_{1-6}$ alkylene group; T is a terminal group including $C_{1-6}$ alkyl group, $C_{3-6}$ cycloalkyl group, or $C_{6-12}$ aromatic group; l is 0.05 to 0.3; m is 0.1 to 0.2; n is 0.5 to 0.8; 1+m+n=1; x is 40 to 100; and o is 10 to 120.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

In one embodiment, a copolymer is provided, which has a chemical structure of Formula 1.

(Formula 1)

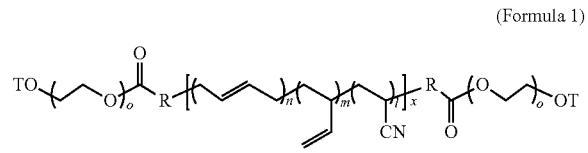

In Formula 1, R is $C_{1-6}$ alkylene group, and T is a terminal group including $C_{1-6}$ alkyl group, $C_{3-6}$ cycloalkyl group, or $C_{6-12}$ aromatic group. The copolymer in Formula 1 is a tri-block copolymer, wherein A is end capped polyethylene glycol (PEG), B is carboxyl terminated butadiene acrylonitrile (CTBN), and A and B is connected through an ester group. In some embodiments, the terminal group T is methyl group, and the copolymer can be referred to MPEG-CTBN-MPEG. In one embodiment, l is 0.05 to 0.3, m is 0.1 to 0.2, n is 0.5 to 0.8, 1+m+n=1, and x is 40 to 100. The value of l, m, n, and x can be selected by choosing commercially available product or changing the monomer ratios for synthesizing the copolymer. The CTBN can be synthesized according to U.S. Pat. No. 3,285,949. It should be illustrated here that the repeating units corresponding to l, m, and n are randomly arranged. In short, the CTBN is a random copolymer. An epoxy resin composite is also provided, which includes 100 parts by weight of epoxy resin and 1 to 20 parts by weight of toughness enhancer such as the above copolymer.

In one embodiment, o is 10 to 120. An overly small o value cannot enhance the toughness of the epoxy resin. An overly large o value may lower the glass transfer temperature (Tg) of the epoxy resin. The value of o can be selected by choosing commercially available product or changing the monomer ratios for synthesizing the MPEG. The MPEG can be synthesized according to US Pub. No. 20100172996. On the other hand, if the repeating unit corresponding to o (ethylene glycol) is replaced with another alkylene glycol (e.g. propylene glycol), the copolymer cannot be compatible with the epoxy resin to enhance the toughness of the epoxy resin composite.

In one embodiment, the copolymer can be synthesized as indicated below. It should be understood that the following synthesis is just for illustration other than limiting the scope of the disclosure. One skilled in the art may choose other synthesis strategies, other than the following synthesis strategy, to synthesize the copolymer.

First, CTBN is reacted with $SOCl_2$, such that the terminal carboxyl groups of the CTBN are changed to acyl chloride groups. Subsequently, PEG with one end cap (e.g. MPEG) is reacted with the acyl chloride to form a tri-block copolymer. The reaction is shown in Formula 2, and the definitions of R, T, l, m, n, o, and x in Formula 2 is similar to the description above.

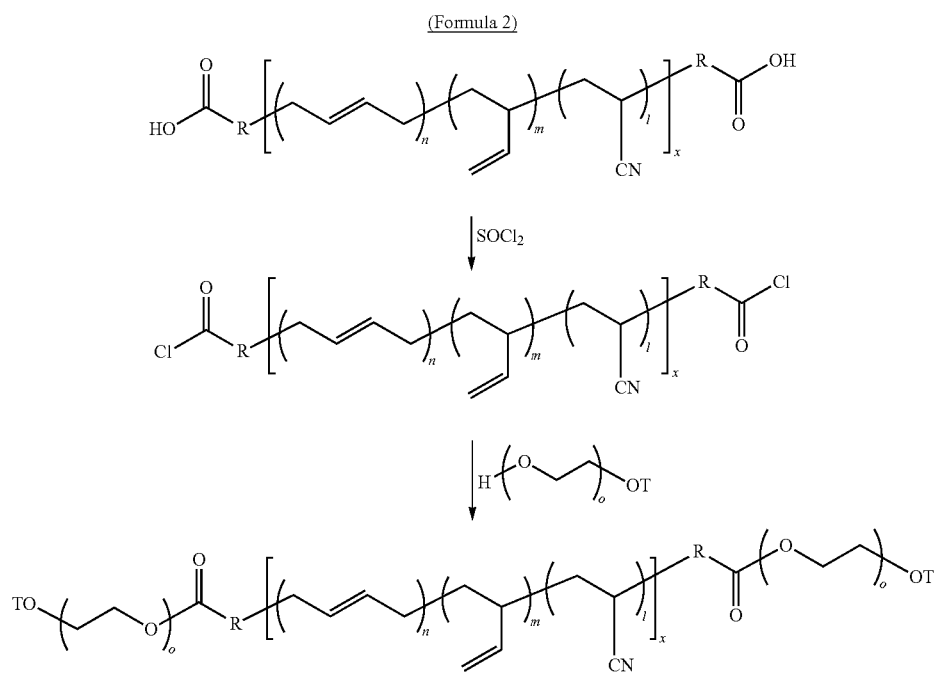

(Formula 2)

In one embodiment, the copolymer may serve as a toughness enhancer of an epoxy resin. For example, 100 parts by weight of epoxy resin may collocate with 1 to 20 parts by weight of toughness enhancer such as the above copolymer to efficiently improve the toughness of the epoxy resin composite without lowering the thermal stability (e.g. Tg) of the epoxy resin composite. An overly low ratio of the copolymer cannot efficiently improve the toughness of the epoxy resin composite. An overly high ratio of the copolymer may lower the thermal stability of the epoxy resin composite. In the epoxy resin composite, the CTBN segment in the copolymer will aggregate inside, and the end capped PEG (e.g. MPEG) at two sides of the copolymer will disperse outside to form micelles. The copolymer and the epoxy resin will not form chemical bondings (e.g. crosslink) therebetween. If the copolymer includes other functional groups, such as epoxy resin, carboxylic group, hydroxyl group, or amino group, with a reactivity to crosslink with the epoxy resin, the copolymer may crosslink with the epoxy resin to reduce the toughness of the epoxy resin composite. In one embodiment, the epoxy resin can be bisphenol A type epoxy resin, bisphenol type epoxy resin, novolac type epoxy resin, cresol-novolac type epoxy resin, tetrafunctional amine type epoxy resin, or a combination thereof. In one embodiment, the epoxy resin composite may further include 1 to 100 parts by weight of additive such as a curing agent, an accelerator, a flame retardant, a smoke suppressant, an UV absorber, or a combination thereof to modify the properties of the epoxy resin composite. For example, the curing agent can be fat, aromatic amine, heterocyclic amine, or dicyandiamide. The accelerator can be imidazole, organic anhydride, sulfide, or peroxide. The flame retardant can be a halogen-containing flame retardant, halogen-free flame retardant, inorganic flame retardant, or organic-inorganic hybrid flame retardant. The smoke suppressant can be molybdenum trioxide, magnesium hydroxide, ammonium octamolybdate, or zinc borate. The UV absorber can be benzophenone, salicylate, aromatic compound, or imidazole.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Preparation Example 1 (Preparation of $MPEG_{750}$-CTBN-$MPEG_{750}$)

30 g of CTBN (1300X13, commercially available from Emerald/CVC) and 100 mL of anhydrous $CH_2Cl_2$ were stirred by a magnetic stirring bar to be totally dissolved. 4 g of $SOCl_2$ was then added into the CTBN solution to be heated to 55° C. (reflux) for obtaining an intermediate product (CTBN-COCl), a CTBN with modified terminal groups of acyl chloride (—COCl).

The above reaction result was distilled in vacuum (0.5 torr and 60° C.) to remove un-reacted $SOCl_2$ and anhydrous $CH_2Cl_2$. The CTBN-COCl was then dissolved in 200 mL of anhydrous $CH_2Cl_2$, and 14.1 g of MPEG750 (molecular weight of 750, commercially available from Aldrich) was then added into the CTBN-COCl solution to be heated to 55° C. (reflux). The reaction result was re-precipitated by hot water to remove un-reacted $MPEG_{750}$, thereby obtaining a product $MPEG_{750}$-CTBN-$MPEG_{750}$ (see Formula 1, wherein T is methyl group).

The product $MPEG_{750}$-CTBN-$MPEG_{750}$ was determined by FTIR, which had an ethylene oxide character peak of 1102 $cm^{-1}$ and a carbonyl group character peak at 1736 $cm^{-1}$. The FTIR spectrum means that the $MPEG_{750}$ was successfully bonding to the CTBN. The product $MPEG_{750}$-CTBN-$MPEG_{750}$ was also determined by $^1$H NMR, which had an ethylene oxide character peak at 3-4 ppm, and a MPEG$_{750}$/CTBN integration area ratio of 2:1. The $^1$H NMR spectrum means that the product MPEG$_{750}$-CTBN-MPEG$_{750}$ was successfully prepared. The number average molecular weight (Mn) of the MPEG$_{750}$-CTBN-MPEG$_{750}$ was 11094, which was analyzed by gel permeation chromatography (GPC).

Preparation Example 2 (Preparation of MPEG$_{2000}$-CTBN-MPEG$_{2000}$)

Preparation Example 2 was similar to Preparation Example 1, and the difference in Preparation Example 2 was the MPEG$_{750}$ was replaced with MPG$_{2000}$ (molecular weight of 2000, commercially available from Aldrich). The product MPEG$_{2000}$-CTBN-MPEG$_{2000}$ was also determined by FTIR and $^1$H NMR, which had similar character peaks to prove that the product MPEG$_{2000}$-CTBN-MPEG$_{2000}$ was successfully prepared (see Formula 1, wherein T is methyl group). The Mn of the MPEG$_{2000}$-CTBN-MPEG$_{2000}$ was 15009, which was analyzed by GPC.

Preparation Example 3 (Preparation of MPEG$_{5000}$-CTBN-MPEG$_{5000}$)

Preparation Example 3 was similar to Preparation Example 1, and the difference in Preparation Example 3 was the MPEG$_{750}$ was replaced with MPG$_{5000}$ (molecular weight of 5000, commercially available from Aldrich). The product MPEG$_{5000}$-CTBN-MPEG$_{5000}$ was also determined by FTIR and $^1$H NMR, which had similar character peaks to prove that the product MPEG$_{5000}$-CTBN-MPEG$_{5000}$ was successfully prepared (see Formula 1, wherein T is methyl group). The Mn of the MPEG$_{5000}$-CTBN-MPEG$_{5000}$ was 29525, which was analyzed by GPC.

Comparative Example 1

100 parts by weight of bisphenol A epoxy resin (Araldite LY 556, commercially available from Ciba), 90 parts by weight of anhydride curing agent (Aradur 917, commercially available from Huntsman), and 2 parts by weight of accelerator (Accelerator DY 070, commercially available from Huntsman) were charged in a high speed dispersed homo mixer (HC0025, commercially available from Shan-Chiou business Corporation) to be evenly mixed, thereby obtaining a matrix.

The matrix was then stirred at 30° C., and then poured into a sample mold to be cured by following conditions: kept at 80° C. for 4 hours, and then kept at 150° C. for 8 hours. As a result, an epoxy resin composite sample was obtained, and the sample size was depended on the ASTM method.

Comparative Example 2-1

85 parts by weight of the matrix in Comparative Example 1 was stirred at 30° C., about 15 parts by weight of CTBN (Hypro 1300X13) served as a toughness enhancer was added to the stirred matrix, and the mixture was then stirred for additional 30 minutes. The mixture was then poured into a sample mold to be cured by following conditions: kept at 80° C. for 4 hours, and then kept at 150° C. for 8 hours. As a result, an epoxy resin composite sample was obtained, and the sample size was depended on the ASTM method.

Comparative Example 2-2

Comparative Example 2-2 was similar to Comparative Example 2-1, and the difference in Comparative Example 2-2 was the matrix amount being reduced to 80 parts by weight and the toughness enhancer (CTBN) amount being increased to 20 parts by weight.

Example 1-1

95 parts by weight of the matrix in Comparative Example 1 was stirred at 30° C., about 5 parts by weight of MPEG$_{750}$-CTBN-MPEG$_{750}$ (prepared in Preparation Example 1) served as a toughness enhancer was added to the stirred matrix, and the mixture was then stirred for additional 30 minutes. The mixture was then poured into a sample mold to be cured by following conditions: kept at 80° C. for 4 hours, and then kept at 150° C. for 8 hours. As a result, an epoxy resin composite sample was obtained, and the sample size was depended on the ASTM method.

Example 1-2

Example 1-2 was similar to Example 1-1, and the difference in Example 1-2 was the matrix amount being reduced to 90 parts by weight and the toughness enhancer (MPEG$_{750}$-CTBN-MPEG$_{750}$) amount being increased to 10 parts by weight.

Example 2

95 parts by weight of the matrix in Comparative Example 1 was stirred at 30° C., about 5 parts by weight of MPEG$_{2000}$-CTBN-MPEG$_{2000}$ (prepared in Preparation Example 2) served as a toughness enhancer was added to the stirred matrix, and the mixture was then stirred for additional 30 minutes. The mixture was then poured into a sample mold to be cured by following conditions: kept at 80 for 4 hours, and then kept at 150° C. for 8 hours. As a result, an epoxy resin composite sample was obtained, and the sample size was depended on the ASTM method.

Example 3

95 parts by weight of the matrix in Comparative Example 1 was stirred at 30° C., about 5 parts by weight of MPEG$_{5000}$-CTBN-MPEG$_{5000}$ (prepared in Preparation Example 3) served as a toughness enhancer was added to the stirred matrix, and the mixture was then stirred for additional 30 minutes. The mixture was then poured into a sample mold to be cured by following conditions: kept at 80° C. for 4 hours, and then kept at 150° C. for 8 hours. As a result, an epoxy resin composite sample was obtained, and the sample size was depended on the ASTM method.

The resin toughness such as (1) tensile toughness measured by ASTM D638, (2) fracture toughness (Izod impact) measured by ASTM D256, (3) fracture toughness K1c (single-edge notched bending, SENB) measured by ASTM D5045, and (4) fracture toughness G1c measured by ASTM D2344, and (5) thermal resistance (glass transfer temperature, Tg) of Comparative Example 1, Comparative Example 2-1, Comparative Example 2-2, Example 1-1, Example 1-2, Example 2, and Example 3 were evaluated as shown in Table 1, wherein the higher value means better toughness or thermal resistance.

TABLE 1

| Sample | Parts by weight of matrix | Toughness enhancer (parts by weight) | Tensile toughness (MPa) | Fracture toughness (Izod impact, kj/m²) | K1c (MPa/m^{1/2}) | G1c (kj/m²) | Tg (° C.) (DMA) |
|---|---|---|---|---|---|---|---|
| Comparative Example 1 | 100 | None | 0.350 | 2.21 | 0.52 | 0.103 | 151.5 |
| Comparative Example 2-1 | 85 | CTBN (15) | Not measured | 4.15 | Not measured | Not measured | 142.6 |
| Comparative Example 2-2 | 80 | CTBN (20) | 2.287 | 4.19 | 1.14 | 0.115 | 141.4 |
| Example 1-1 | 95 | MPEG$_{750}$-CTBN-MPEG$_{750}$ (5) | 3.357 | 5.05 | 1.41 | 0.214 | 152.2 |
| Example 1-2 | 90 | MPEG$_{750}$-CTBN-MPEG$_{750}$ (10) | Not measured | 5.00 | Not measured | Not measured | Not measured |
| Example 2 | 95 | MPEG$_{2000}$-CTBN-MPEG$_{2000}$ (5) | 2.501 | 4.70 | 1.39 | 0.217 | 146.3 |
| Example 3 | 95 | MPEG$_{5000}$-CTBN-MPEG$_{5000}$ (5) | 3.292 | 4.41 | 1.16 | 0.184 | Not measured |

As shown in Table 1, the toughness enhancer of Preparation Examples 1-3 might efficiently improve the tensile toughness and the fracture toughness of the epoxy resin composite, and kept the thermal resistance (Tg) of the epoxy resin composite as that of the pure epoxy resin (about 152.2° C.). Accordingly, the toughness enhancer of the disclosure may efficiently improve the toughness of the epoxy resin without the problem from the conventional toughness enhancer CTBN (e.g. lowering the thermal stability of the epoxy resin).

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A copolymer, having a chemical structure of:

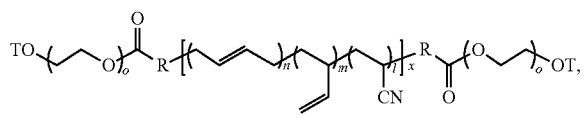

wherein R is C$_{1-6}$ alkylene group;
T is a terminal group including C$_{1-6}$ alkyl group, C$_{3-6}$ cycloalkyl group, or C$_{6-12}$ aromatic group;
l is 0.05 to 0.3;
m is 0.1 to 0.2;
n is 0.5 to 0.8;
l+m+n=1;
x is 40 to 100; and
o is 10 to 120.

2. The copolymer as claimed in claim 1, wherein the T is methyl group.

3. An epoxy resin composite, comprising:
100 parts by weight of epoxy resin; and
1 to 20 parts by weight of a toughness enhancer,
wherein the toughness enhancer is a copolymer having a chemical structure:

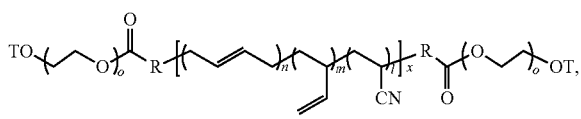

wherein R is C$_{1-6}$ alkylene group;
T is a terminal group including C$_{1-6}$ alkyl group, C$_{3-6}$ cycloalkyl group, or C$_{6-12}$ aromatic group;
l is 0.05 to 0.3;
m is 0.1 to 0.2;
n is 0.5 to 0.8;
l+m+n=1;
x is 40 to 100; and
o is 10 to 120.

4. The epoxy resin composite as claimed in claim 3, wherein T is methyl group.

5. The epoxy resin composite as claimed in claim 3, wherein the epoxy resin comprises bisphenol A epoxy resin, bisphenol epoxy resin, novolac epoxy resin, cresol-novolac epoxy resin, tetrafunctional amine epoxy resin, or a combination thereof.

6. The epoxy resin composite as claimed in claim 3, further comprising 1 to 100 parts by weight of additive.

7. The epoxy resin composite as claimed in claim 6, wherein the additive comprises a curing agent, an accelerator, a flame retardant, a smoke suppressant, a UV absorber, or a combination thereof.

* * * * *